July 12, 1938.  E. PROVOST  2,123,257
SERVING TRAY
Filed April 13, 1936  2 Sheets-Sheet 1
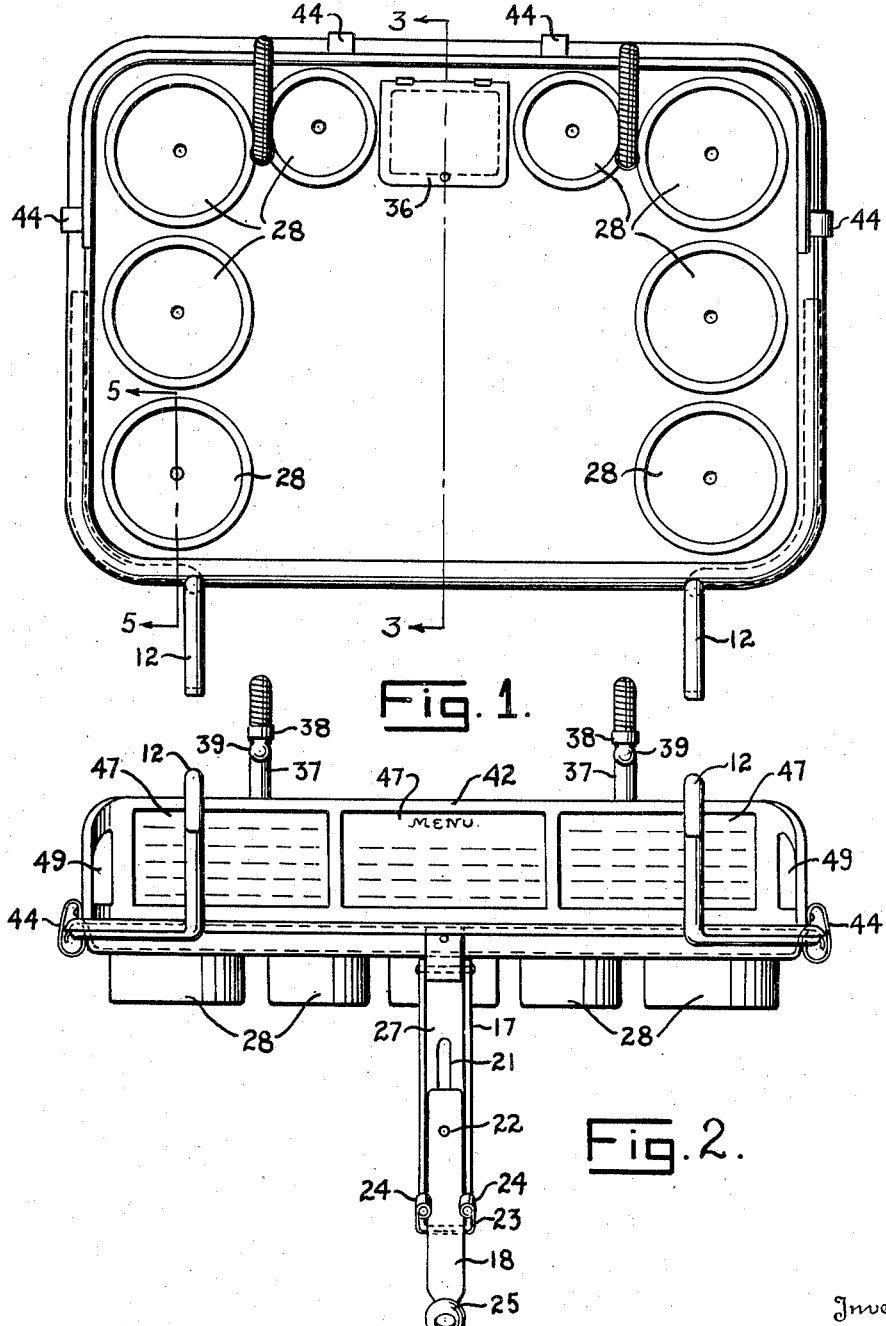

July 12, 1938.  E. PROVOST  2,123,257
SERVING TRAY
Filed April 13, 1936  2 Sheets-Sheet 2
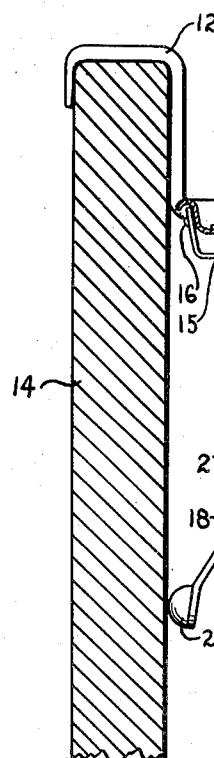
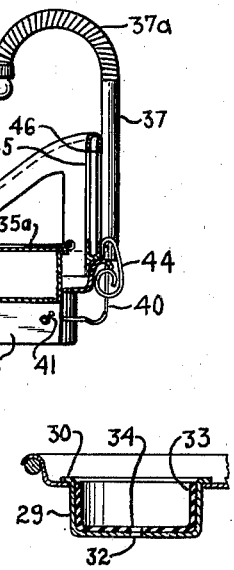
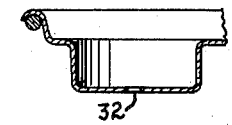
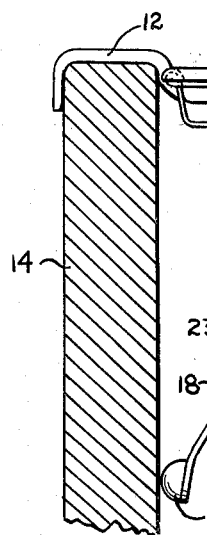
Fig. 3.
Fig. 5.
Fig. 6.
Fig. 4.
Inventor
Euzebe Provost.
Jesse R. Stone
Lester B. Clark
By
Attorneys.

Patented July 12, 1938

2,123,257

UNITED STATES PATENT OFFICE 2,123,257

SERVING TRAY

Eusebe Provost, Houston, Tex.

Application April 13, 1936, Serial No. 74,046

3 Claims. (Cl. 40—10)

This invention relates to serving trays and more particularly to serving trays of the type which are designed for attachment and use on automobiles.

One object of the invention is to provide a tray which can be readily attached to and removed from the side of an automobile.

A second object of the invention is to provide a tray having an improved arrangement of receptacles for glasses, bottles, and the like.

A third object of the invention is to provide a tray having illuminating means.

A fourth object of the invention is to provide a tray comprising a frame for the reception of written matter such as menus and advertising.

Other objects of the invention will appear in the following description when read in connection with the accompanying drawings, in which:

Fig. 1 is a plan view of a tray embodying the present invention.

Fig. 2 is a rear elevational view of the tray illustrated in Fig. 1.

Fig. 3 is a sectional view of the tray illustrated in Fig. 1 and of the door of an automobile, the section of the tray being taken on line 3—3 of Fig. 1.

Fig. 4 is an end elevational view of the modified form of tray.

Fig. 5 is a fragmentary sectional view taken on line 5—5 of Fig. 1, the view showing the construction of one of the holders or receptacles of the tray, and Fig. 6 is a fragmentary sectional view of the tray illustrated in Fig. 4, the section being taken through one of the receptacles of such tray.

The tray illustrated in Figs. 1, 2, 3 and 5 comprises a plate 10 formed with upstanding edges 11, which are curled over at their upper ends. The plate 10 is designed to be supported from the door of an automobile by two hooks 12 and a brace 13 in the manner illustrated in Fig. 3, the automobile door being indicated in such figure by the numeral 14. The hooks 12 extend under the curled portions of the edges 11 of the plate 10, and are secured to the edges 11 by soldering or brazing. The brace 13 is attached to the plate 10 by means of a bar 15 secured to bottom of the plate by rivets 16, and comprises an upper member 17 and a telescopically associated lower member 18.

The upper member 17 of the brace 13 is U-shaped in cross-section, and is constructed with a pair of ears 19, which straddle the bar 15 and which receive a pin 20 extending across the top of the bar. The member 17 is further constructed with a slot 21 for reception of a threaded pin 22 carried by the lower member 18, and with a spring clip 23 secured to its lower end and formed with roller portions 24 which extend over the member 18. The member 18 is provided at its lower end with a rubber member 25 for engagement with the door of the automobile, and carries a wing nut 26 mounted on the pin 22 through which it is adjustably clamped in position with respect to the member 17.

The pin 20 is so located with respect to the upper end of the rear web 27 of the member 18 that the brace can be slid longitudinally of the bar 15 when the lower end of the brace is elevated, but co-operates with the upper end of the web 27 to grip the bar 15 when the brace is moved into operative position with its lower end engaging the side of the door of the automobile.

The plate 10 is constructed with a plurality of depressed receptacles 28 for the accommodation of bottles and glasses. Eight such receptacles have been shown arranged along the sides and back of the plate, but any desired number of receptacles, arranged in any desired manner, may be used. The receptacles 28 consist of metal cups 29 set in apertures formed in the plate 10 as illustrated in Fig. 5. Such cups are formed with flanges 30 which engage with the upper surface of the plate 10 and with apertures 32 to permit the drainage of liquid therefrom. They are secured in place by soldering flanges 30 to upper surface of the plate 10. If desired, such cups may be fitted with rubber inserts 33 formed with apertures 34 designed to register with the apertures 32.

Secured in an aperture formed in the rear portion of the plate 10, there is a box-like receptacle 35 having a hinged lid 35a. This receptacle is designed for the reception of sugar or other substances which it may be desired to protect from moisture.

Secured to the bottom of the receptacle 35 there is a second box-like structure 36 designed to receive an electric battery, and mounted on the rear of the tray there are two standards 37 fitted with fixtures 38 for the reception of electric light bulbs 39. The receptacle 36 is connected to the fixture 38 by means of wires 40 designed to convey electrical energy from a battery in such receptacle to the lights 39, and mounted on the side of the receptacle 36, there is a switch 41 for making and breaking the electrical connections between the battery and the lights. The standards 37 are constructed with flexible metal conduits 37a adjacent the fixtures 38 which permit adjustment of the light bulbs with respect to the plate 10.

Mounted on the up-turned edges of the plate 10 at the rear thereof, there is a removable frame 42 designed for the reception of written matter such as menus and advertising. Such frame comprises a flange 43 which extends inside the edges of the tray, and a plurality of spring clips 44 which are sprung over the curled upper ends of the edges of the tray to secure the frame in position. The back portion of such frame is constructed with front and rear walls 45 and 46, between which the written matter is inserted and with openings 47 for the display of written matter. The sides of the frame are formed with flanges 48 designed to overlap inserted written matter and with apertures 49 for the display of such matter.

The tray illustrated in Figures 4 and 6 is very similar in construction to the tray illustrated in Figs. 1, 2, 3 and 5, and like numerals have been used to indicate corresponding parts. Such tray differs from the first described tray in that the hooks 12 are constructed with shorter downward extensions, and in that the receptacles 28 are constructed in a different manner by being formed integral with plates 10 as illustrated in Fig. 6.

To apply either tray to an automobile, the hooks 12 are first inserted over the sill of the window of the automobile with the brace 13 withdrawn to the rear of the bar 15, and with the member 18 secured or held in retracted position. The brace 13 is then moved forward to a proper bracing position and the member 18 extended into engagement with the door, sufficient force being applied to cause the upper end of the member 17 to tightly grip the bar 15. After the member 18 has been extended as described, the nut 26 is tightened completing the attachment.

What is claimed as new is:

1. An attachment for a serving tray comprising a U-shaped frame having spaced walls with openings in the inner wall thereof for the reception and display of written matter, a flange on said frame comprising a downward extension of the inner wall of the frame and designed to fit within the upstanding edge of a tray, and spring clips on the ends and back of said frame adapted to be sprung over the outside edge of the tray to secure the frame in position.

2. An attachment for a serving tray comprising a double walled frame, said walls being spaced apart to provide a recess adapted for reception of printed matter between the walls, a window in one of said walls, for display of said printed matter, a flange on said frame comprising a downward extension of the inner wall designed to engage a portion of the tray, and spring clips on the frame adapted to engage the tray and secure the frame upon the tray.

3. An attachment for a serving tray comprising a double walled U-shaped frame adapted to be positioned along three edges of a serving tray, said frame having openings in the inner wall thereof for reception and display of printed matter, and spring clips on the back and ends of said frame to resiliently engage the tray and secure the frame to the tray.

EUZEBE PROVOST.